United States Patent
Brown

(10) Patent No.: US 6,446,058 B1
(45) Date of Patent: Sep. 3, 2002

(54) COMPUTER PLATFORM ALARM AND CONTROL SYSTEM

(75) Inventor: Abby H. Brown, Cumming, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/299,018

(22) Filed: Apr. 26, 1999

(51) Int. Cl.[7] ............................................... G06N 5/02
(52) U.S. Cl. .......................... 706/60; 379/9; 379/10; 379/29
(58) Field of Search ........................ 706/60; 379/9, 379/10, 29

(56) References Cited

U.S. PATENT DOCUMENTS

| | | |
|---|---|---|
| 4,972,453 A | 11/1990 | Daniel, III et al. |
| 5,175,795 A | 12/1992 | Tsuda et al. |
| 5,408,587 A | 4/1995 | Maier et al. |
| 5,687,212 A * | 11/1997 | Kinser, Jr. et al. ............ 379/10 |
| 5,790,633 A * | 8/1998 | Kinser, Jr. et al. ............ 379/10 |
| 5,790,634 A * | 8/1998 | Kinser, Jr. et al. ............ 379/29 |
| 5,953,389 A * | 9/1999 | Pruett et al. .................... 379/9 |

OTHER PUBLICATIONS

Fred Baker, "Notification Systems", DBMS Online, Feb. 1997, 7 Pages.

* cited by examiner

Primary Examiner—Kakali Chaki
(74) Attorney, Agent, or Firm—Banner & Witcoff

(57) ABSTRACT

A computer network alarm and control system for use in a network comprising a plurality of platforms susceptible to failure comprises a notification system coupled to the network of platforms for receiving an alarm signal from the platforms and outputting a notification identifying a platform indicating an alarm, a qualification of the alarm and a severity of the alarm and an expert system including an inference engine coupled to the notification system, the inference engine having an associated knowledge base for outputting an appropriate resolution to the notification system. An optional explanation facility system communicates with the inference engine of the expert system, the explanation facility system, responsive to a query, outputting an explanation for the appropriate resolution. The expert system is preferably frame-based, having frames for software, hardware and middleware faults and errors, each frame having slot names and values, the slot names including the identity of the platform (or node), symptom, severity, resolution and the like.

16 Claims, 5 Drawing Sheets

| SLOT NAME | SLOT VALUE |
|---|---|
| NODE | REFER TO VALDEF STATEMENTS BELOW FRAME |
| SYMPTOM | REFER TO VALDEF STATEMENTS BELOW FRAME |
| ERROR_CLASS(IFICATION) | INVOKE RULE SET ---------►<br>1. IF ERROR REPORTED IS SOFTWARE RELATED TO COMMUNICATIONS BETWEEN SERVERS PASSING MESSAGING REQUESTS, THEN ERROR_CLASS = MIDDLEWARE<br>2. IF ERROR REPORTED IS HARDWARE, THEN ERROR =/ MIDDLEWARE<br>3. IF ERROR IS APPLICATION LEVEL, THEN ERROR =/ MIDDLEWARE<br>4. IF ERROR IS OS, THEN ERROR =/ MIDDLEWARE<br>5. IF ERROR IS TRANSPORT LAYER (TCP/IP), THEN ERROR =/ MIDDLEWARE |
| SEVERITY_LEVEL | INVOKE RULE SET ---------►<br>1. IF SYSTEM IS UNUSABLE BY USERS, THEN SEV = 1<br>2. IF A CLUSTER OF USERS ARE UNABLE TO USE SYSTEM OR WORKAROUND EXISTS FOR SEVERITY 1 ERROR, THEN SEV = 2;<br>3. IF SYSTEM UNUSABLE FOR A FEW ISOLATED USERS, THEN SEV = 3<br>4. IF USER INTERFACE DISPLAYS GUI ERRORS AND USERS CAN CONTINUE TO USE SYSTEM, THEN SEV = 4 |
| RESOLUTION_PROCEDURE | INVOKE PROCEDURAL ATTACHMENT ---------►<br>1. IF ERROR CLASSIFICATION AND SEVERITY LEVEL ARE KNOWN, THEN MATCH ON RESOLUTION PROCEDURE AND DISPLAY |

FIG. 2A

| | |
|---|---|
| MAINTENANCE PLATFORM | |
| HAS PROPERTY: MIRRORED DISK | |
| IS: COMPUTER SYSTEM | |
| HAS PARTS: SOFTWARE --------→ MIDDLEWARE HARDWARE | SOFTWARE: C |
| IS MONITORED: 24 BY 7 | HAS PROPETY: COMPILED INTERPRETER |

FIG. 2B

```
platform_maint_frame( [node: node,
                       msgGroup: MsgGroup,
                       message: Message,
                       resolution: Resolution] )
```

FIG. 3

| SLOT NAME | SLOT VALUE |
| --- | --- |
| NODE | REFER TO VALDEF STATEMENTS BELOW FRAME |
| SYMPTOM | REFER TO VALDEF STATEMENTS BELOW FRAME |
| ERROR_CLASS(IFICATION) | INVOKE RULE SET --------▶<br>1. IF ERROR REPORTED IS SOFTWARE RELATED TO COMMUNICATIONS BETWEEN SERVERS PASSING MESSAGING REQUESTS, THEN ERROR_CLASS = MIDDLEWARE<br>2. IF ERROR REPORTED IS HARDWARE, THEN ERROR =/ MIDDLEWARE<br>3. IF ERROR IS APPLICATION LEVEL, THEN ERROR =/ MIDDLEWARE<br>4. IF ERROR IS OS, THEN ERROR =/ MIDDLEWARE<br>5. IF ERROR IS TRANSPORT LAYER (TCP/IP), THEN ERROR =/ MIDDLEWARE |
| SEVERITY_LEVEL | INVOKE RULE SET --------▶<br>1. IF SYSTEM IS UNUSABLE BY USERS, THEN SEV = 1<br>2. IF A CLUSTER OF USERS ARE UNABLE TO USE SYSTEM OR WORKAROUND EXISTS FOR SEVERITY 1 ERROR, THEN SEV = 2;<br>3. IF SYSTEM UNUSABLE FOR A FEW ISOLATED USERS, THEN SEV = 3<br>4. IF USER INTERFACE DISPLAYS GUI ERRORS AND USERS CAN CONTINUE TO USE SYSTEM, THEN SEV = 4 |
| RESOLUTION_PROCEDURE | INVOKE PROCEDURAL ATTACHMENT --------▶<br>1. IF ERROR CLASSIFICATION AND SEVERITY LEVEL ARE KNOWN, THEN MATCH ON RESOLUTION PROCEDURE AND DISPLAY |

*FIG. 4*

| SLOT NAME | SLOT VALUE |
|---|---|
| NODE | ORLFLTT0 |
| SYMPTOM | TIER 2 SERVER UNABLE TO CONNECT TO TIER 3 SERVER |
| ERROR_CLASSIFICATION | MESSAGEQ TIME-OUT |
| SEVERITY_LEVEL | 2 OF POSSIBLE 4 |
| RESOLUTION_PROCEDURE | BOUNCE MESSAGEQ PROCESSES ON TIER 2 SERVER |
| MAN PAGE | UNEXPECTED TIMEOUT: BUS = 200 GRP = 100 IS NOT RUNNING |

COMPUTER PLATFORM ALARM AND CONTROL SYSTEM

BACKGROUND OF THE INVENTION

1. Technical Field

The present invention relates to the technical field of servicing alarms and performing maintenance on heterogeneous computer platforms and, in particular, to an expert system comprising a client/server notification system for reporting diverse alarm diagnostic and nodal identification data and a generalized inference engine for receiving the data and, responsive thereto, performing a frame-based analysis to match the diagnostic data to potential resolutions and outputting a resolution for computer platform implementation.

2. Description of the Related Arts

Localized notification systems are known from, for example, the article "Notification Systems" by Stewart McKie, published in *DBMS ONLINE,* February, 1997, at dbmsmag.com on the World Wide Web. In computer systems, notifications occur as the result of an event which may be a system event, such as the addition or failure of a component, or a business event, such as a successful posting of a transaction to an accounting system. There exist many types of notifications including: informational notifications, prompting notifications, alerting notifications, exception notifications and the like. Notifications are typically triggered immediately after the event triggering the notification. McKie discusses several business applications of such notification systems but does not describe their use with an expert system, let alone an inference engine, for diagnosing computer network failures.

A hybridized frame inference and fuzzy reasoning system and method are known from U.S. Pat. No. 5,175,795. Tsuda et al. describe an inference mechanism that executes human logical and fuzzy thought including intuitive thought via a frame inference engine based on human logical thought.

An expert system having a frame explanation system is known from U.S. Pat. No. 5,408,587 to Maier et al. FIG. 1 shows an inference engine for operation with a rule base and an explanation system coupled to the rule base and the system output for providing an explanation of a selected rule, for example, strategy or reason explanations. According to FIG. 4, after a fact is received at step 310 that fires a rule a rule at steps 320, 330, a frame is created at step 340 into which is placed the strategy explanation and the reason explanation for the rule class in which the invoked frame is present. The created frame can be placed automatically at the correct node in an explanation tree (FIG. 3) along with an inference explanation.

Also, an autonomous expert system for directly maintaining remote telephone switching systems is known from U.S. Pat. No. 4,972,473 to Daniel III et al. FIG. 1 shows that the public switched telephone network may be directly coupled via modem to an expert system. The public switched telephone network may be considered to comprise remote computer systems. The expert system first accesses a fault report from a centralized service reporting center, establishes a data connection to the computer system reporting the fault, invokes diagnostic routines for gathering data and, if appropriate and possible, clear the reported fault from the computer system. For example, the expert system is capable of maintaining different vintages of the same private branch exchange (a private computer switching system) by interrogating each private branch exchange via the data connection.

Computer maintenance engineers (CME's) wage a never ending battle upon the repeated receipt of computer event notifications. They must trouble shoot and identify root causes of possibly hundreds of different computer faults and errors for a given platform. Their experience and knowledge is learned over time from repeated successes with resolving faults and errors. However, the great diversity of computer system types and the inability of the human mind to rapidly retrieve from memory specific resolutions to, for example, more infrequent system faults or errors leaves room for considerable improvement in the fault and error recognition and resolution process in computer networks including one or more computer platforms.

Thus, there remains an opportunity in the art to provide a notification system, for example, that performs the routine tasks of the CME in analyzing an event to obtain a root cause of an alarm signal and an inference engine for matching the output of the notification system to an appropriate resolution to the alarm.

SUMMARY OF THE INVENTION

The problems and deficiencies of prior art notification and expert systems are overcome in accordance with the principles of the present invention, an expert system comprising a client/server notification system for reporting heterogeneous alarm diagnostic and nodal identification data and a generalized inference engine for receiving the data and, responsive thereto, performing a frame-based analysis to match the diagnostic data to potential resolutions and outputting a resolution, automated where possible, for computer platform implementation. Moreover, the expert system of the present invention is coupled to an explanation facility system for providing an explanation to a CME in response to an ad-hoc query and for reporting a best match to a resolution in the event a confidence level is not met by the inference engine in outputting a resolution.

The present invention is the subject of the inventor's PhD dissertation entitled "System Requirements for a New Management Control Expert System Generalized Inference Engine Interfacing with a Client/Server Notification System" submitted to the School of Computer and Information Sciences, Nova Southeastern University in May, 1998, the disclosure of which is incorporated herein by reference as to its entire contents.

These and other features of the present invention will be best understood from the drawings and the detailed description of the invention which follows.

BRIEF DESCRIPTION OF THE DRAWINGS

FIG. 1 provide an overview of the computer platform alarm and control system of the present invention wherein

FIG. 2 provide examples of a frame of an expert system according to the present invention wherein FIG. 2a provides a general example of a frame having procedural attachments and FIG. 2b provides a specific example of a frame of the Platform_maint expert system of the present invention for a superclass Software in Prolog programming language (where software, middleware and hardware are three classes of maintenance faults).

FIG. 3 provides a table of slot names and slot values of a Middleware class frame according to the present invention.

FIG. 4 provides a frame implementation including slot names and slot values for an inherited Middleware frame based on the Middleware frame described in part by the requirements table of FIG. 3.

DETAILED DESCRIPTION OF THE DRAWINGS

Figure 1A:
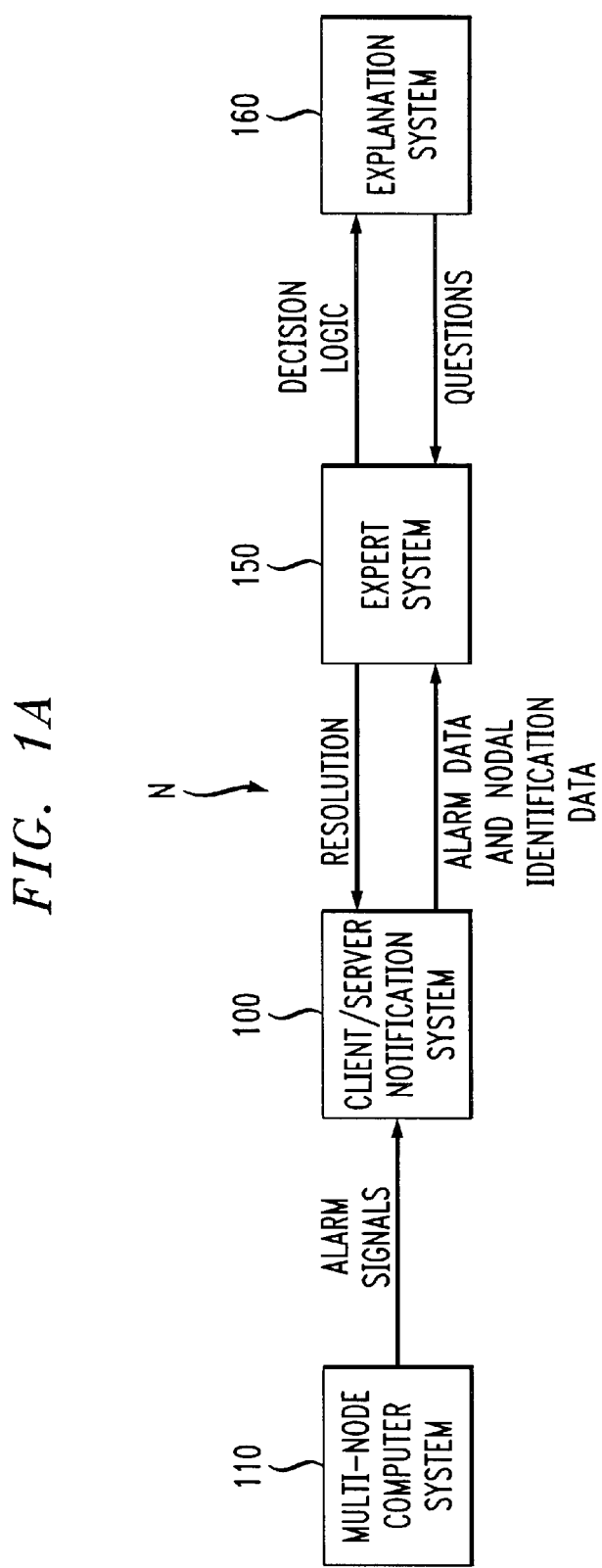
FIG. 1a is a simplified functional block diagram of the expert system of the present invention and FIG. 1b provides a detailed system block diagram, the system comprising a client/server (C/S) notification system 100, an expert system 150, and an explanation system 160. Systems 100, 150 and 160 interface with a multi-node computer system comprising platforms P1 to PN via links to the notification system 100.
Figure 1B:
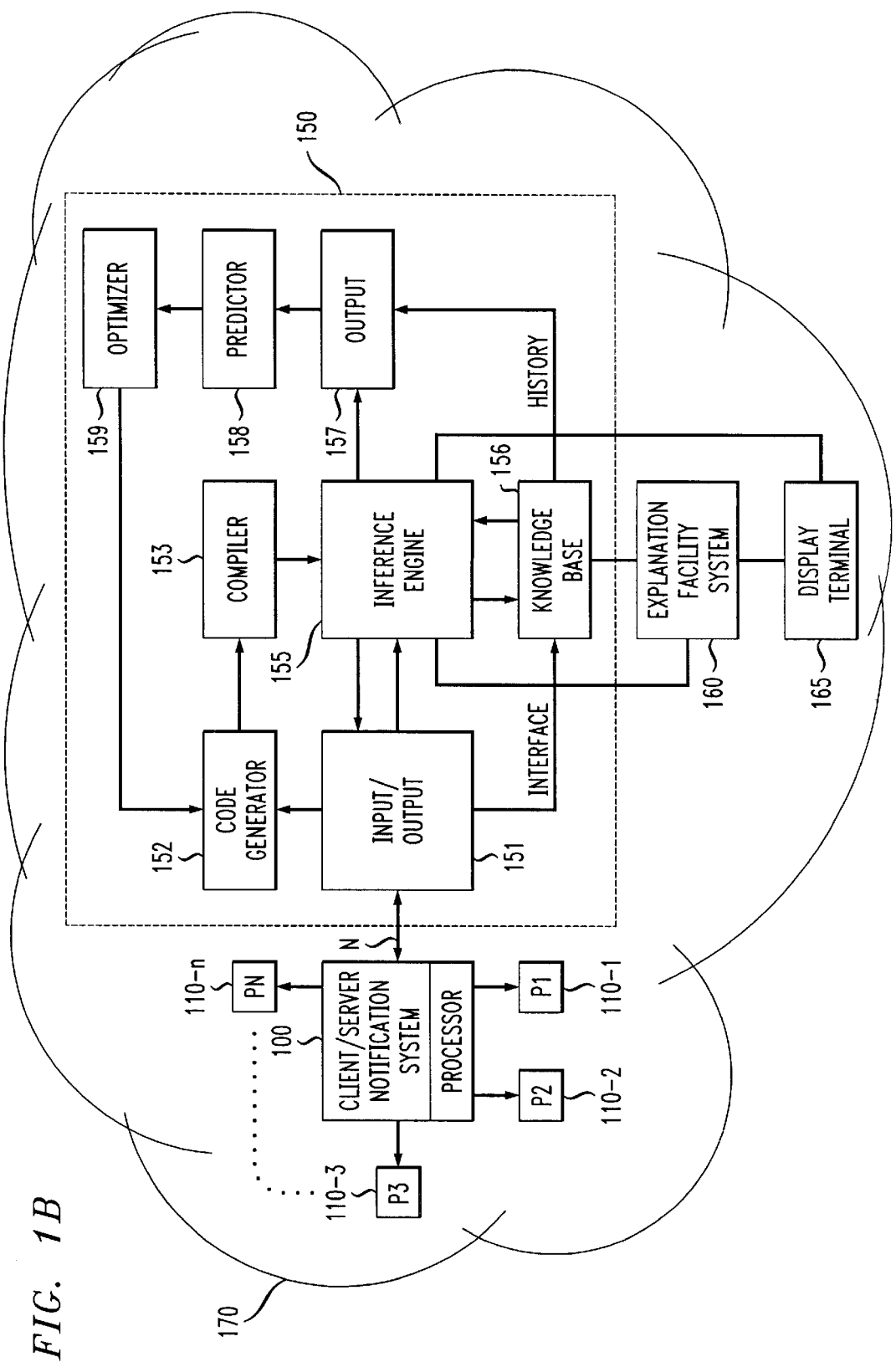

Referring first to FIG. 1a, there is shown a generalized system block diagram, the system comprising a client/server (C/S) notification system 100, an expert system 150, and an explanation system 160. The client/server notification system is coupled to a multi-node computer system 110. The multi-node computer system comprises a plurality of nodes or computer platforms which may have the same or different manufacturer and vintages. The multiple nodes may have varying capabilities and be constructed differently of hardware, software and what will be referred to herein as middleware, which is the intermediate structural area between true software and true hardware. Connecting links are shown in FIG. 1b connecting platforms P1 to PN to the notification system 100. These connecting links over which events are reported to C/S Notification System 100 may each be a switched or packet data link or other data link over any medium known in the art, for example, optical, radio or electrical. In accordance with the present invention, the primary event operated upon by the expert system of the present invention, among others, is a maintenance or alarm signal event for reporting a fault or maintenance event occurring at a minimum at one particular node. The C/S Notification System 100 outputs alarm data and nodal identification data to expert system 150. Thus, it distinguishes among all events to obtain those events having alarm and maintenance significance and may perform a preliminary root cause analysis. The notification system comprises a data processor for identifying and potentially interpreting alarms as fault or error related which in turn substantially supplants the function of the CME. The result is the alarm data and nodal identification data output to expert system 150. Expert system 150, as will be further described herein, is preferably a frame-based inference engine. The engine matches the alarm data and nodal identification data using its interpretation abilities with previously created or newly created frames having slots preferably programmed in Prolog language. Software, hardware and middleware faults and errors are matched to previous error conditions reported via alarms and then possible, appropriate resolutions and/or the best matched resolution is reported back to the C/S Notification System 100 for implementation in the multi-node computer system 110. In a preferred embodiment, the intelligence is engineered into the expert system 150, and the notification system 100 is responsible for nodal identification and hand-off of an alarm interpretation to expert system 150. The expert system 150 passes the platform resolution back to the notification system 100 for resolution in the identified platform (node). An optional explanation facility system 160 provides explanations for the logical decisions of the inference engine of the expert system upon query. Thus, the CME may be actively involved in the resolution process as necessary.

FIG. 1b shows the expert system in further detail. Platforms P1–PN are labeled 110-1 to 110-n of multi-node computer system 110. Cloud 170 may comprise the public switched telephone network, a packet-switched telephone network or combination computer network in which the platforms P1–PN may be located (shown) or to which the platforms may be connected (not shown). Moreover, the C/S notification system 100 may be inside network cloud 170 (shown) or outside the cloud and connected to it (not shown). Finally, the inference engine and knowledge base system 150 and explanation facility system may each be located within the network cloud 170 (shown) or located outside the network cloud 170 (not shown).

The inference engine and knowledge base system 150 comprises an input/output (I/O) interface 151 for interfacing with the C/S notification system 100. Inference engine 155 receives newly generated code via code generator 152 and compiler 153 wherein the code generator 152 is responsive to an output system 157, 158 and 159 and the input/output interface 151. The inference engine 155 is responsible for categorizing and matching reported faults and errors. The output system 157, 158, 159 receives commands from the inference engine 155 and accepts historical data from the knowledge base 156. In particular, output element 157 outputs a match to a predictor 158 for providing a confidence level and the output match to an optimizer 159 for optimizing a solution from the input match. The inference engine 155 is coupled to a knowledge base 156 for receiving created frames and managing frames and slots. The knowledge base accepts input from input/output interface 151 and outputs historical data to output 157. Further, the knowledge base receives new frame data from the inference engine 155 and requests for frame matching and outputs best frame match data to inference engine 155.

Explanation facility system 160 permits a dialog between a CME and the inference engine decision making process whereby a CME may query about a particular response and receive a logic output. Moreover, any exceptions whereby a decision confidence level are not met may be reported to a CME for resolution assistance via terminal 165 which may be a display terminal. The display terminal 165 may directly query the inference engine 155 without the intervention of an explanation facility system 160.

Now the expert system of the present invention will be particularly described with reference to FIGS. 2–4. FIG. 2a provides a general example of a frame having procedural attachments that are actually rules. A frame contains the hierarchies of classes, objects and the attributes of objects that can be assigned or inherited from another frame or created via procedures. The attributes are filled into the slots of a frame. Slots can be created for a frame and represent a special attribute of the frame, its type and value. The value can be computed by a procedure or inherited from another frame representing a class. Optional facets associated with frames provide for attribute bounds or constraints, functions implemented to return values and procedures for modifying values. Rules/procedures can be contained in the value of a slot or a system call embedded within the value of a slot can invoke rules/procedures. Frames differ from rules in that a frame facilitates representation of default values, references or points to other frames containing rules and procedures for which values can be specified and conditions of any action that needs to be taken. Slots are filled in by the expert system as information is collected. These slots can be derived from data that has already been entered into other slots. Similar to an array, rules or logic expressions can call upon a frame or an attribute slot of a frame.

FIG. 2a is a frame entitled maintenance platform. Four slots are shown in the depicted frame: has property, is, has parts and is monitored. Each slot then has a value. The has_property slot has the value: mirrored disk. The is: slot has the value: computer system. The has_parts slot has the value: software, middleware and hardware. This slot has a pointer from the software value to a further slot entitled:

Software that has the value: C (as in the C computer language). The is_monitored slot has the value: 24 by 7, shorthand for 24 hours, seven days a week. The is_monitored slot points to another slot: has_property slot which has the value: compiled or interpreted. The procedural attachment, then, pertains to a frame that handles an actual alarm signal reported to notification system 100 by the multi-node system 110 comprising platforms as a platform fault or error. The different acts of the classification of the alarm, matching the alarm to its symptoms, classification of its severity level and then matching the fault or error to its correct resolution_procedure is determined through the use of the frame's specific slots that invoke or call procedural attachments to reference system rules developed for inferencing logic.

The inferencing system for the C/S notification system 100 provides a means by which an expert system handles heterogeneous alarm data from the diverse system 100 inputs. Preferably the expert system comprises an ontological database with slots and associated rules/procedures written in Prolog whereby predicate calculus and Prolog define matching, binding, inference and unification methods to handle the heterogeneous data and generate conclusions in the form of system resolutions. In particular, the inference engine 155 utilizes a frame-based paradigm as its knowledge representation scheme and Prolog frame slots which may reference rules for matching, binding, inferencing and unification purposes.

The organization of objects into classes stems from defining a superclass Software and its inherited class named Middleware. Middleware inherits the attributes of Software and also has an attribute name Man page which is unique to itself. One particular instance of Middleware may be MessageQ, which inherits attributes from Middleware. The inferencing method builds upon the relationships between the objects (classes). Further, it provides the mechanism by which the Prolog language is able to generalize and apply unification principles to the objects. In the central handling of heterogeneous data by the inference engine 155, the frames detail some of the classes of data that are received from the notification system 100 and later written in Prolog.

The expert system knowledge base 156 stores updates and deletes multiple system faults and associated resolution data organized in related blocks. In order to resolve the system faults, the system requirements for the inference engine 155 of the present invention may include: (i) the identity of the node upon which the error occurs, since the system environment is heterogeneous (multiple different platforms of different vintages); (ii) the symptom(s) reported by the notification system 100; (iii) the error classification which refers to the type of error based upon root cause determination by the notification system 100; (iv) a severity level, for example, ranging from a critical value of 1 to an enhancement value of 5; and (v) a resolution based upon the predicates (i) through (iv).

Referring to FIG. 2b, there is shown an example of a frame for the superclass Software in Prolog. As shown, the superclass Software contains common data for the Platform_maint expert system of the present invention. Initial definitions are provided for node, msgGroup, message and resolution. From the superclass Software, several classes are derived including the class Middleware. A class Middleware possesses many of the traits or attributes of the superclass including the following: (i) node; (ii) symptom; (iii) error classification; (iv) severity level; and (v) resolution. For a class Middleware frame stored in the knowledge base 156, slots are created for these five attributes and values populated once data is received from the inference engine 155. The slots of the frame are designed to be populated automatically by the expert system 150 of the present invention without user input.

On the other hand, users such as CME are provided with explanation facility system 160 so that the logic of inference engine 155 can be queried and followed on an on-demand basis by the CME. Further, derived values are implemented in Prolog via procedural attachments to frames.

An example of a derived attribute is outage time. The inference engine 155 first parses the values from system logs for the following attributes: (i) validate that the symptom implies an outage; (ii) the time stamp when the associated symptom was written to a system error log; and (iii) the time stamp for when the resolution procedure implemented in response to an alarm is successfully completed. This process preferably occurs in short term memory.

The corresponding algorithm written in Structured English follows and will later be written as a rule per procedural attachment in Prolog:
1. Validate that the reported symptom implies an outage.
   IF yes, THEN proceed to Step 2;
   IF no, THEN end procedure.
2. Write the time stamp when symptom was written to error log.
3. Write the time stamp when corresponding resolution procedure completes successfully.
4. Calculate time difference between Steps 2 and 3.
5. Write value to slot Outage time.

The requirement for the class: Middleware frame in Prolog appears below:
   platform_maint_frame([ node:Node,
   symptom:Symptom,
   errorResolution:ErrorResolution,
   severity_level:Severity_level,
   resolution:Resolution]).

Frames written in Prolog are not limited to holding only factual information. In the platform_maint_frame, procedural attachments are defined for utilization by the procedures within the program. The attribute or slot named Symptom defines a list of valid values that are well suited to be populated in the Symptom slot. The expert system 150 uses this additional information to verify that the notification system 100 data has the correct type of information for this slot. This data validation serves as an initial gate to subsequent processing. Inference engine 155 identifies invalid data during data validation up-front via a data editor so it can be handled differently from data inputs that are recognized as valid by the inference engine knowledge base 156. The benefit of the input data validation process is increased inference engine 155 throughput.

The functional requirement for the class: Middleware in frame representation is provided in FIG. 3. The depicted frame is provided by way of example only and comprises slot names and values for slot names selected by the inventor. Other names may be used and values may be defined which differ from the given names and still obey the principles of the present invention. The slot name Node has the value: Refer to valdef statements below frame. The slot name Symptom has the value: Refer to valdef statements below frame. The slot name Error_class(ification) has the value: Invoke rule set. Invoke_rule_set points to: 1. If error reported is software related to communications between servers passing message requests, then error_class= middleware; 2. If error reported is hardware, then error=/ middleware; 3. If error is application level, then error=/ middleware; 4. If error is OS (operating system), then error=/middleware; 5. If error is transport layer (TCP/IP), then error=/middleware. The slot name Severity_level has the value: Invoke rule set. Invoke_rule_set points to: 1. If system is unusable by users, then sev=1; 2. If a cluster of users are unable to use system OR workaround exists for severity 1 error; then sev=2; 3. If system unusable for a few isolated users, then sev=3; and 4. If user interface displays GUI errors AND users can continue to use system, then sev=4. The slot name Resolution_procedure has a value: Invoke procedural attachment. Procedural_attachment points to: 1. IF error classification AND severity level are known, THEN match on resolution procedure and display.

Based on the Middleware frame of FIG. 3, an instance of an inherited Middleware frame appears in FIG. 4. As before, the frame comprises Slot Names having Slot Values, which may be named and defined differently by one of ordinary skill in the art without deviating from the principles. The frame of FIG. 4 inherits all the attributes of the Middleware frame of FIG. 3. In addition, the frame of FIG. 4 contains a slot named Man page that is not an attribute of the Middleware frame of FIG. 3. Its purpose is to provide a help function for the computer maintenance engineers.

Examining the frame in further detail, the first slot name Node has the value: ORLFLTTO. Referring to FIG. 1b, the node value refers to a platform, for example, platform P2 110-2 which may represent a platform in Orlando, Florida with the designator TTO. The slot name Symptom has the value: Tier 2 server unable to connect to Tier 3 server. The slot name Error_classification has the value: MessageQ time-out. The slot name Severity_Level has the value: 2 out of possible 4. The slot name Resolution_Procedure has the value: Bounce MessageQ processes on Tier 2 server. The slot name Man page helps the customer maintenance engineer and may have the value: Unexpected timeout: BUS= 200 GRP=100 is not running which can be an explanation to the maintenance engineer of what the trouble is and in what element of the identified node. BUS 200 and GRP 100, for example, may be an explicit identification of a bus and group link definition where there has been an unexpected timeout. Thus, FIG. 4 comprises a MessageQ instance of a Platform_Maint Middleware class frame.

All MessageQ alarms can now be described in terms of how they differ from this default alarm. Given values assigned to attributes, the system provides alarm status for automatic or manual resolution. Each new frame describing a MessageQ alarm is a descendant of the parent Middleware class. Each alarm inherits all of the attributes of its parent except those selected to specifically override. Each alarm may also have some attributes that are missing from the parent alarm, as MessageQ possesses all the attributes of the Middleware frame, but also has the Man page attribute which may be required by maintenance engineers at the implementation level. However, this attribute is most likely not required at the class level, since system implementation will invoke an instance of the class Middleware named MessageQ.

In the Prolog language, the frame is defined as a structure containing a list of slots. Each slot has a name and a value separated by a colon. Prolog treats a Name:Value pair as a single argument but the different parts of the argument can be accessed as need. These attributes are all provided by the knowledge database 156:

| | From: |
|---|---|
| Platform_maint ([node: Node, | Knowledgebase & Procedural Attachment |
| symptons:Symptoms, | Knowledgebase & Procedural Attachment |
| error:Error, | Knowledgebase & Procedural Attachment |
| severity:Severity | Knowledgebase & Procedural Attachment |
| resolution:Resolution | Knowledgebase & Procedural Attachment |
| man page:Man page ]). | Knowledgebase & Procedural Attachment |

Consequently, Prolog is a preferred mode for implementing a program according to the present invention. Other computer languages may be developed which are comparable or may be improvements on Prolog but still be encompassed within the scope of the present invention.

The Platform_maint frame structure does not only retain the factual data. Procedural attachments are defined for use by the procedures within the program. The procedural attachments are used to define a question or list of valid values that can appear in the named slot. The system uses this additional data to ask a question when it needs to fill in the slot or to verify that the system has supplied the correct type of data for a particular slot.

The Platform_maint frame with procedural attachments states that one attachment is a question to ask when the system requires a value for the slot. The other attachment is a list of valid values for that slot. When the system needs to fill in the Node slot, for example, of FIG. 3, it parses the error message provided by the notification system 100 for data specific to the node which reported the system error or fault (for example, the values of all the platforms 110-1 to 110-n in the computer network of FIG. 1b, one example of which may be ORLFLTT0 of FIG. 4). Once the data is parsed from the log files (to which the data inputs received from the notification system 100 are written), the inference engine 155 fills in the data for the Middleware slots in the database 156. This step may be processed in short term memory and specifically verifies data integrity for the attribute slots via the procedural attachment. This processing step is significant in that it validates data early in the processing phase for purposes of avoiding the completion of processing before determining that the slot input was invalid. This step avoids unnecessary processing throughput associated with processing an invalid system value.

Value Definitions

The following valdef structures hold the procedural attachments to define the valid values that the Node slots can retain. For example, the Nodes slot has five valid values for this slot, each with their own values in a network of five platforms being maintained. A node as used herein is typically a switch or other device capable of transfering data or switching communications between facilities or in a time or frequency mutliplexed manner. Examples of nodes given below include an LC or local controller which may be Denver, Colo. or Ojus, Fla. (locations of large AT&T toll switches; ATGADM or an Atlanta, Ga. administrative node (for example, an OAM&P node) which may be an SSE or HP server; KC for Kansas City with 0 and 1 representing a redundant pair; ALPH0 and ALPH1 for Alpharetta, Ga. redundant pair and DSTS which may represent a digital switch test system known in the art. When the inference engine 155 requires a value for a slot, it checks with the data parsed from the system log. The system answer is checked by the frame list of valid values, for example:

valdef (node, 'ATGADM', application).
  valdef (node, 'ATGADM', SSE server).
  valdef (node, 'ATGADM', HP server).
  valdef (node, 'BP', KCTT0).
  valdef (node, 'BP', KCTT1).
  valdef (node, 'ESP', ALPHA0).
  valdef (node, 'ESP', ALPHA1).
  valdef (node, 'LC', DNVRCOMA).
  valdef (node, 'LC', OJUSFLTL).
  valdef (node, 'DSTS', Primary).
  valdef (node, 'DSTS', Backup).

Once the Node is determined, then the symptoms are parsed by the inference engine 155. An instance of the class Middleware, MessageQ exhibits behaviors that are symptomatic of specific faults. For example, the maintenance engineers are unable to access a trouble ticket application from their work stations. In the example below, it shoudl be understood that a bouncing link is one that may maintain an up state for a period of time and then, without warning, is down, and then returns to an up state and so on. Severity may be defined in terms of how and how many users are affected or in terms of time or a combination of these factors or other factors. For example, because a majority of users are affected at mutliple work stations for a period of time in excess 10 minutes, the severity assigned may be a high priority (Severity:1). Alternatively, because a majority of users are affected for a period of time less than a ten minute window, a severity level may be low priority (Severity :3). In Prolog, this would be written as:

valdef (symptom, 'No access to BP application', noconnect).
  valdef (symptom, 'Slow access to BP application', slowconnect).
  valdef (symptom, 'Intermittent access to BP application', intermitconnect).
  valdef (symptom, 'Connect then disconnect to BP application', disconnect).
  valdef (symptom, 'Connect but no response', dead).
  valdef (error, 'Link down', down).
  valdef (error, 'Link bouncing', bouncing).
  valdef (error, 'Link timeout', timeout).
  valdef (error, 'Link up but no communication', group id not running).
  valdef (error, 'Duplicate link receivers exist', duplicate link listeners).
  valdef (error, 'Duplicate link senders exist', duplicate link senders).
  valdef (severity, 'Unable to perform tasks', 1 ).
  valdef (severity, 'Difficult to perform tasks, workaround exists', 2 ).
  valdef (severity, 'Problem isolated to one cluster of users', 3 ).
  valdef (severity, 'Type on explanation facility', 4 ).
  valdef (resolution, 'text displayed stored in error text library',* (wildcard character).
  valdef (resolution, 'text not found in error text library', unexpected error).
  valdef (man page, 'text displayed in man page library',# (wildcard character).
  valdef (man page, 'text not found in man page library', unexpected error).

Rules dictate the behavior of the system 150 in both cases when either the resolution and/or man page are not found. The rules are written as frames that have been filled in:
  When resolution procedure exists, display.
  Else, use the unification technique to match the common errors.
  Else, notify Maintenance engineers to contact Field Support.

Rules Coded in the Prolog Language

In Prolog, rules may be represented as follows for the above-identified symptoms:

rule (symptom:no access BP application, [sev: [1, 2], error: [link down]]).
  rule (symptom:no access BP application, [sev: [1, 2], error: [link bouncing]]).
  rule (symptom:no access BP application, [sev: [1, 2], error: [link timeout]]).
  rule (symptom: no access BP application, [sev: [1, 2], error: [linkup, no communication]]).
  rule (symptom: no access BP application, [sev: [1, 2], error: [duplicate link receivers]]).
  rule (symptom: no access BP application, [sev: [1, 2], error: [duplicate link senders]]).
  rule (symptom: slow access BP application, [sev: [1, 2], error: [link bouncing]]).
  rule (symptom: slow access BP application, [sev: [1, 2], error: [link up, no communication]]).
  rule (symptom: slow access BP application, [sev: [1, 2], error: [duplicate link receivers]]).
  rule (symptom: slow access BP application, [sev: [1, 2], error: [duplicate link senders]]).
  rule (symptom: connect then disconnect to BP, [sev: [1, 2], error: [link timeout]]).
  rule (symptom: connect then disconnect to BP, [sev: [1,2], error: [duplicate link receivers]]).
  rule (symptom: connect then disconnect to BP, [sev: [1, 2], error: [duplicate link senders]]).
  rule (symptom: connect, no response to BP, [sev: [1, 2], error: [link timeout]]).
  rule (symptom: intermittent access to BP, [sev: [1, 2], error: [link timeout]]).
  rule (symptom: intermittent access to BP, [sev: [1, 2], error: [duplicate link receivers]]).
  rule (symptom: intermittent access to BP, [sev: [1, 2], error: [duplicate link senders]]).

Thus, there have been defined above seventeen valid rules for determining the resolution to multiple system faults reported via the notification system. While others may be able to define slightly fewer or require more rules in a particular network of platforms 110-1 to 110-n than seventeen, it would appear clear that a considerably improvement in efficiency of a computer maintenance engineer may be provided in accordance with the principles of the present invention.

Question structures store questions associated with each slot in the frame. Since the Platform_maint_frame has a user interface 165 via explanation facility 160 or directly with inference engine 155, system questions may be considered within this inferencing method. However, in a presently preferred embodiment, user questions are addressed within the explanation facility 160.

Derived Values

A requirement for platform outage time is a derived value based upon the time at which the system error or fault is received by the platform maintenance expert system 150 from the notification system 100 AND the time at which the resolution procedure is completed by the maintenance engineer. These rules are written as frames, for example:

rule(outage time: [error: [link down], severity: [1, 2], resolution: [time stamp when procedure was completed and fault resolved]]).
INVOKE system: ?platform_main
retrieves frame:
  Platform_maint_frame ( [Node, Symptom, Error, Severity, Resolution]).
  The inference engine 155 parses the input and validates the data as follows:
  bind_all ( [ ],_).
  bind_all ( [S:V | Slots], I):
    first_unbound_slot (S:V | Slots, I, Index),
    system choose_value ([S:V | Slots], Index), bind_all (Slots, Index).
  first_unbound_slot predicate recursively searches list slots not instantiated. If valued, then seek variable uninstantiated.
  When unbound slot is found, bind_all routine passes list (valded to system choose_value.
Ask questions with unbound slot and get_ans:
  system_choose_value ( [Slot: Val | Slot]):
    question (Slot, Q),
    write (Q),
    get_ans (Slot, Val, Q),!.
If invalid answer, print valid answers and re-address question:
  get_ans (Slot, Ans, Q):
    read (ans),
    (write (Valid Answers': Slot), n1, valdef ( Slot, Prompt, Def )).

The Software_frame stores different types of data in slots. The Software frame defines any errors reported at the application layer by different systems. The valdef structures define procedural attachments for the software frame. Rules for determining length of outage are also represented by frames. The system requirements for the Platform maintenance expert system 150 uses both static and dynamic data. The frame definition, procedural attachment and heuristics constitute the static data because these remain the same throughout the program and from one execution of the program to another. However, the program running on the inferencing engine 155 continually parses new data as reported by notification system 100. The expert system 150 uses this data to automatically complete a fresh copy (or instance) of the frame. This refers to the inference engine's dynamic data.

Invocation of the Expert System 150

Frame-based systems differentiate between a definition of a frame and an instance of that frame. Every instance has the same number and type of slots. All procedural attachments and heuristics apply equally to all instances. However, each instance has different values for its slots. When the system 150 is invoked, the first step that the Platiorm maintenance expert system 150 takes will be to retrieve a copy of the Software_frame from its database:
  Software_frame([Node, Error, Severity, Outage Time]).

After it retrieves the Software frame, the Maintenance platform expert system 150 performs a data audit against the Node identification data it has parsed from its log files. System 150 verifies the parsed input against the valid values for these slots from knowledge base 156. These steps are part of a recursive loop (bind_all) performed on the list of slots that require system input. The objective of this requirement is to validate data at the start of the processing cycle. Validation insures that the throughput is not unnecessarily increased by processing invalid data and then aborting the processing later on in the cycle. Validation proceeds as follows:
  bind_all([ ]. _).
  bind_all([S : V |Slots], I):
    first_unbound_slot([S : V | Slots], I, Index),
    user_choose_value([S : V | Slots], Index),
    bind_all(Slots, Index).

The first_unbound_slot predicate recursively searches the list for elements that are not yet filled in. The predicate will succeed if the Val argument is a variable. Else, it skips over instantiated variables and tests whether the next element is a variable.
  first_unbound_slot ([Slot : Val | Slots]):
    var(Val), !.
  first_unbound_slot([_|Slots]):
    first_unbound_slot(Slots).

When an unbound element is identified, bind_all passes the list to a predicate called system_choose_value. It searches for the data associated with the unbound slot and calls get_ans to fill in the slot with a system response.
  system_choose_value([ZSlot:Val |Slots]):
    question(Slot, Q),
    write (Q),
    get_ans(Slot, Val, Q),
    !.

Get_ans reads the system response and checks that it is valid. If it is not valid, get_ans sends a message to the notification system 100 showing the valid values defined for the slot. The expert system 150 waits for a response from the notification system 100. If none is received within a predetermined period of time, for example, three minutes, the inference engine 155 then seeks to qualify the response. If it is still unable to reconcile the differences, the inference engine 155 may send a message to a meta-expert system (not shown) which is responsible for error handling on a more global basis or call in the maintenance engineer for assistance via interface 165.
  get_ans(Slot, Ans, Q):
    read(Ans),
    valdef(Slot, _, Ans),!.
  get_ans(Slot, Ans, Q):
    write('Valid values for slot':Slot), n1,
    get_ans_aux(Slot,Q),
    get_ans(Slot,Ans,Q).
  get_ans_aux(Slot, Q):
    valdef(Slot, Prompt, Def),
    tab(2), write(Prompt:Def), n1, fail.
  get_ans_aux(Slot, Q):
    n1, write(Q).

Unification

Unification is the process of applying rules to instances as floows: Unification
  apply_rules(Trule:Tval,Frules):
    rule(Trule:Tval, Frule_list),
    unify (Frules,Frule_list).
  unify([ ],[ ])
  unify([H : VAL[T], [H1 : Val 1 | T1]):
    member(Val, Val 1 ),
    unify (T, T1).

The expert system 150 first applies its rules to determine the value of Node. Then it applies the rules to determine the symptom. This is performed by adding two apply_rules goals to the main Platform_maint predicate in the inference engine 155 program.

Platform_main:
   software_frame( [Node, Symptom, Error, Resolution, Outage_time]).
   bind_all([Node, Symptom, Error, Resolution], 1 ),
   apply_rule (Severity_level, [Symptom, Num_users_affected]).
The Explanation Facility
   Explanation facility system 160 may provide explanations according to the following:
      get_explain ([Node, Symptom, Error, Resolution, Outagetime]):
      n1,
      explain (_, $_{Outage}$_time, O_exp),
      explain (_Severity, Sev_Exp),
   ?-Platform_maint.
   Valid values for slot: Outage_time
      Exceed allocated window: +
      Equal allocated window: =
      Under allocated window:
      Ans: Symptom: Unable to access BP application.
         Outage_time: +
         Severity_level: 1.
   Users are unable to access the BP application of the given node through their workstations. The outage time exceeds the allocated outage window, thereby increasing the likelihood that the outage is a severity 1. In the following, resolutions are indexed with 0000-9999 alocated for different resolutions, DQ 0014 being one such resolution. The system 150 backtracks through the proven goals and assembles the pieces of the explanation:
      explain (Node: KCTT0,
         The fault is reported on BP's KCTT0 server.
      explain ( Symptom: Unable to access BP application,
         The symptom is significant because users are unable to do their work.
      explain (Severity: 1
         Severity is assigned the highest rating for users unable to work.
      explain ( Resolution: DQ 0014
         Severity is assigned the highest rating for users unable to work.
      explain ( Outage_time: +
         Allotted time for fault repair has been exceeded.
Projected Outcomes
   The system requirements provided above for a new expert system 150 including an inferencing engine 155 and an associated notification system 100 may be used to deploy powerful centralized notification and expert systems for improved platform maintenance in comparison with prior art systems. While the present system 100, 150, 160 may be deployed for just one platform, the system may be optimally deployed as a centralized maintenance system for a large computer network comprising multiple heterogeneous platforms of different vintages. With such intelligent control and savings in computer maintenance engineering personnel, the result should be more efficient and controlled management of multiple computer platforms by a centralized work force who require less expertise. With the system of the present invention, the high level of knowledge has been generalized and engineered into the inference engine 150 and associated database 156. Commercially, the results are increased platform control at less cost. The above system assumes real-time platform alarm reporting from alarm producing systems providinging actual data and events, for example: BP, ATGADM, KCTT1, ALPH0, LC DNVRCOMA and DSTS.

Any patent applications or United States patents referred to herein should be deemed to be incorporated by reference as to their entire contents. The invention should only be deemed to be limited in scope by the claims that follow.

What I claim is:

1. A computer network alarm and control system for use in a network comprising a plurality of platforms susceptible to failure comprising:

a notification system coupled to said network of platforms for receiving an alarm signal from said platforms and outputting a notification identifying a platform indicating an alarm, a qualification of said alarm and a severity of said alarm; and an expert system including an inference engine coupled to said notification system, said inference engine having an associated knowledge base for outputting an appropriate resolution to said notification system.

2. A computer network alarm and control system as recited in claim 1 further comprising:

an explanation facility system for communication with said inference engine, the explanation facility system, responsive to a query, outputting an explanation for said appropriate resolution.

3. A computer network alarm and control system as recited in claim 1 wherein said notification system is coupled to said plurality of platforms by links, said notification system for periodically receiving fault and error data from said platforms in real time over said links.

4. A computer network alarm and control system as recited in claim 1 wherein said inference engine is frame-based, each frame comprising at least one slot name and slot value, frames being defined for each of hardware, middleware and software.

5. A computer network alarm and control system as recited in claim 4 wherein slot names include nodal identification, symptom, severity and resolution.

6. A computer network alarm and control system as recited in claim 4 wherein said at least one slot name comprises at least four slot names representing nodal identification, symptom, severity and resolution.

7. A method for use in a computer network comprising a plurality of platforms susceptible to failure, the method for outputting a resolution responsive to receipt of an alarm signal at a notification system and outputting a resolution from an inferencing engine comprising the steps of:

receiving an alarm signal from a platform at said notification system;

identifying the platform;

diagnosing the cause of the alarm signal;

matching data representing said cause to a plurality of frames of a knowledge base at said inferencing engine; and outputting a resolution responsive to a best match of said cause data to a selected one of said frames of said knowledge base.

8. A method as recited in claim 7 further comprising the step of:

receiving a query for an explanation of said resolution; and outputting said explanation for presentation via a presentation terminal.

9. A method as recited in claim 7 wherein said frames each comprise a plurality of slots for invoking system calls to one of rules or procedural attachments to a corresponding frame.

10. A method as recited in claim 9 wherein the frames are defined in Prolog.

11. A method as recited in claim 7 wherein said inference engine is frame-based, each frame comprising at least one slot name and slot value, frames being defined for each of hardware, middleware and software.

12. A method as recited in claim 7 further comprising a method of determining outage time comprising the steps of:

validating an outage, obtaining a time stamp when a system logs the outage and obtaining a time stamp for a successful completion of a resolution; and calculating an outage time from said time stamps.

13. A method as recited in claim 7 wherein said resolution output is responsive to a severity level input from said notification system.

14. A method as recited in claim 13 wherein said resolution is further responsive to identification of a platform and a reported symptom.

15. The computer network alarm and control system of claim 4, wherein the frames include hierarchies of classes, objects and attributes of objects.

16. The method of claim 7, wherein said plurality of frames include hierarchies of classes, objects and attributes of objects.

* * * * *